United States Patent [19]

Drawert et al.

[11] Patent Number: 4,571,267

[45] Date of Patent: Feb. 18, 1986

[54] ALCOHOL-SOLUBLE POLYAMIDES AND PRINTING INKS

[75] Inventors: Manfred Drawert, Froendenberg-Strickherdick; Horst Krase, Hamm, both of Fed. Rep. of Germany

[73] Assignee: Schering AG, Berlin and Bergkamen, Fed. Rep. of Germany

[21] Appl. No.: 550,225

[22] Filed: Nov. 10, 1983

[30] Foreign Application Priority Data

Nov. 26, 1982 [DE] Fed. Rep. of Germany ....... 3243794

[51] Int. Cl.[4] .......................... C09D 11/06; C11C 3/00
[52] U.S. Cl. .................................. 106/27; 260/404.5; 260/DIG. 38
[58] Field of Search ............... 260/404.5 R, 404.5 PA; 106/20, 22, 23, 25, 26, 27, 28, 30, 29, 31

[56] References Cited

U.S. PATENT DOCUMENTS

| | | | |
|---|---|---|---|
| Re. 28,533 | 8/1975 | Drawert et al. | 260/404.5 |
| 3,141,787 | 7/1964 | Goetze et al. | 260/404.5 PA |
| 3,224,893 | 12/1965 | Floyd et al. | 260/404.5 PA |
| 3,253,940 | 5/1966 | Floyd et al. | 260/404.5 PA |
| 3,271,431 | 9/1966 | Baltes et al. | 260/404.5 PA |
| 3,378,488 | 4/1968 | Nimerick | 260/404.5 PA |
| 3,412,115 | 11/1968 | Floyd et al. | 260/404.5 PA |
| 3,420,789 | 1/1969 | Wilson | 260/404.5 PA |
| 3,462,284 | 8/1969 | Vertnick | 260/404.5 PA |
| 3,499,853 | 3/1970 | Griebsch et al. | 260/404.5 PA |
| 3,622,604 | 11/1971 | Drawert et al. | 260/404.5 |
| 3,652,469 | 3/1972 | Glaser et al. | 260/18 N |
| 3,700,618 | 10/1972 | Sharkey et al. | 260/33.4 R |
| 3,781,234 | 12/1973 | Drawert et al. | 260/404.5 PA |
| 3,793,270 | 2/1974 | Goukon et al. | 260/404.5 PA |
| 3,869,484 | 3/1975 | Burke | 260/404.5 PA |
| 4,072,641 | 2/1978 | Loeb | 260/404.5 PA |
| 4,370,273 | 1/1983 | Kinsman et al. | 260/404.5 PA |
| 4,508,868 | 4/1985 | Whyzmuzis et al. | 106/27 |
| 4,514,540 | 4/1985 | Peck | 106/27 |

FOREIGN PATENT DOCUMENTS

1520940  2/1970  Fed. Rep. of Germany .
1645408  5/1970  Fed. Rep. of Germany .

*Primary Examiner*—Natalie Trousof
*Assistant Examiner*—Bruce D. Gray
*Attorney, Agent, or Firm*—Curtis, Morris & Safford

[57] ABSTRACT

Polyamides which are alcohol-soluble at room temperature, are useful in formulating printing inks, and which comprise dimerized fatty acids, at least one aliphatic unbranched monocarboxylic acid and at least one aliphatic branched monocarboxylic acid as the acid component, and ethylenediamine and hexamethylenediamine as the amine component, and printing inks formulated therefrom.

10 Claims, No Drawings

ALCOHOL-SOLUBLE POLYAMIDES AND PRINTING INKS

The present invention relates to polyamides which are alcohol-soluble at room temperature and which comprise polymerized fatty acids, at least one unbranched and one branched monocarboxylic acid, ethylenediamine, and hexamethylenediamine, and to printing inks containing such polyamides as binders therein.

In the manufacture of printing inks, the industry is increasingly demanding good ethanol dilutability as well as good water resistance of dried ink film, in addition to the requisite good solubility at room temperature in alcohols such as propanol, butanol, and particularly ethanol.

Good solubility at room temperature is necessary in order that the ink which during a halt in the work dries on the printing cylinder may be instantly dissolved when printing is resumed. If the dried ink does not dissolve, or does not dissolve instantly, defective and hence unusable prints are produced.

Good dilutability, and particularly good ethanol dilutability, is required in order that the resin does not precipitate even with pronounced momentary changes in concentration. Pronounced local changes in concentration occur when it is necessary to add pure solvent to printing ink which has thickened by evaporation to restore the ink to the requisite viscosity. The low resin concentration then present may result in precipitation of the resin or in clouding of the solution, which then will not produce glossy printing films; in other words, the prints will again be defective and hence unusable.

Good water resistance is required of printing inks whenever the printed articles are exposed to increased moisture concentrations in storage or in use, as, for example, in the deep-freeze storage of packaged foods, in the case of shopping bags, etc.

While alcohol soluble polyamides comprising dimerized fatty acids are known to be used in the manufacture of printing inks, the products are afflicted with shortcomings.

According to German Pat. No. 15 20 940, polyamides comprising dimerized fatty acids, an unbranched aliphatic monocarboxylic acid having from 1 to 5 carbon atoms, ethylenediamine, and an unbranched co-diamine having from 4 to 10 carbon atoms are used as binders for printing inks. While these polyamides are soluble in ethanol and possess good water resistance, their solutions lack adequate ethanol dilutability and satisfactory gelling resistance, especially at temperatures below room temperature.

In accordance with German Pat. No. 16 45 408, polyamides comprising dimerized fatty acids, an unbranched aliphatic monocarboxylic acid having from 1 to 5 carbon atoms, ethylenediamine, and aromatic or cycloaliphatic co-diamines are used as binders for printing inks. Although these products are soluble in ethanol and readily dilutable with ethanol, the water resistance of their solutions is poor and their gelling resistance unsatisfactory.

U.S. Pat. No. 3,412,115 describes polyamides comprising a dimeric fatty acid, an alkylenediamine having from 2 to 3 carbon atoms, hexanemonocarboxylic acids, and optional further monocarboxylic acids, as well as their use as binders for printing inks. However, these products exhibit unsatisfactory adhesion to the printed articles and their solutions possess poor ethanol dilutability and inadequate gelling resistance, especially at temperature below room temperature.

The object of the present invention is to overcome these drawbacks and to provide polyamides, for use as binders for printing inks, which not only are readily soluble in alcohol at room temperature but whose solutions also possess pronounced ethanol dilutability and good gelling resistance, especially at temperatures below room temperature, and which give ink films having high blocking points and good water resistance.

In accordance with the invention, this object is accomplished by the use, as binders for printing inks, of polyamides which are soluble in alcohol, and particularly in ethanol, at room temperature and which are prepared by the condensation of (A) dimerized fatty acids having from 16 to 44 carbon atoms with
(B1) at least one aliphatic unbranched monocarboxylic acid having from 3 to 6 carbon atoms and
(B2) at least one aliphatic branched monocarboxylic acid having from 4 to 9 carbon atoms, the equivalence ratio between components (A) and (B) ranging from 0.73:0.27 to 0.6:0.4, and more particularly being 0.7:0.3, and each of the components (B1) and (B2) being present in an amount of at least 0.1 equivalent, based on a unit total of acid equivalents, and
(C) ethylenediamine and
(D) hexamethylenediamine, the equivalence ratio between components (C) and (D) ranging from 0.7:0.3 to 0.4:0.6.
(E) Inorganic and/or organic pigments and/or soluble dyes, waxes, slip agents, antioxidants, nitrocellulose and extender resins may optionally be combined with such polyamides when used as binders.

The dimerized fatty acids used in accordance with the invention as component (A) are commercially available technical polymerized fatty acids. The term "dimerized fatty acid" generally refers to polymerized acids obtained from fatty acids. The term "fatty acids" covers unsaturated natural and synthetic monobasic aliphatic acids having from 12 to 22, and preferably 18, carbon atoms. These fatty acids can be polymerized by prior-art methods. (See published German patent applications DOS Nos. 14 43 938 and 14 43 968 and German Pat. Nos. 21 18 702 and 12 80 852.)

Typical commercially available polymeric fatty acids have approximately the following composition:
Monomeric acids: 5 to 15 weight percent
Dimeric acids : 60 to 80 weight percent
Trimeric acids: 10 to 35 weight percent.

The dimeric acid content can be increased to 100 weight percent by generally known distilling methods.

The monocarboxylic acid mixture used in accordance with the invention as component (B) is composed of (B1) at least one aliphatic linear monocarboxylic acid having from 3 to 6 carbon atoms, such as propionic acid, n-valeric acid, n-caproic acid, and particularly butyric acid, and
(B2) at least one aliphatic branched monocarboxylic acid having from 4 to 9 carbon atoms, such as the isobutyric acids, isocaproic acids, isoheptanoic acids, isooctanoic acids, and particularly 3-methylbutyric acid and 2-ethylhexanoic acid.

A combination of one of the acids named under (B1) and one of those named under (B2) is preferably used in accordance with the invention The ratio of equivalents of polymerized fatty acid of (A) to the combination of monomeric fatty acids (B)

ranges from 0.73:0.27 to 0.6:0.4, and more particularly is 0.7:0.3, equivalent, taking the total acid equivalent as 1.00. The amount of the monocarboxylic acid combination of (B1) and (B2) of 0.27 to 0.4 equivalent, based on the total acid equivalent, may be divided in varying amounts between the components (B1) and (B2). However, each of the components (B1) and (B2) must be present in an amount of at least 0.1 equivalent, based on the total acid equivalent of 1.00.

For modification of the properties of the end products, small amounts of other reactive components, and particularly of longer chain diamines, may be used in addition to the components (A) to (D) of the invention, their amounts being chosen so that the alcohol solubility, the dilutability, the gelling and water resistance, and the blocking point of the polyamides are not reduced below the levels required in practice.

The total acid components, (A) and (B), and the total amine components, (C) and (D), are present in substantially equivalent amounts. For modification of the properties, minor departures in favor of one or the other are permissible.

Suitable solvents for use in the manufacture of the printing inks are the short chain aliphatic alcohols having from 2 to 4 carbon atoms which are commonly used in this field, such as n-propanol, isopropanol, butanol, isobutanol and particularly ethanol. The esters and ketones usual in this field may be used as modifiers.

The printing ink solutions are adjusted with ethanol to the usual solids content of about 20 to 50 percent, and preferably 25 to 35 percent, corresponding to a runout time from 18 to 25 seconds as determined with a DIN 4 mm viscosity cup in conformity with DIN 53 211.

In addition to the polyamide binder for the printing ink, inorganic and/or organic pigments or soluble dyes, waxes, slip agents, antioxidants, nitrocellulose, extender resins, etc., commonly employed in this field may be used. The possible combinations of these various auxiliaries, in nature and amount, are well known to the average worker skilled in the art of compounding printing inks.

The printing inks to be used in accordance with the invention are employed by the printing industry especially in gravure printing and flexographic printing.

A better understanding of the invention and of its many advantages will be had by referring to the following Examples, given by way of illustration.

EXAMPLE 1

600 g of a commercial dimeric fatty acid having a dimer content of 75 percent (D 75) are introduced together with 44.55 g of propionic acid and 30.7 g of isovaleric acid (equivalence ratio, 0.7:0.2:0.1) into a three necked flask equipped with stirrer, thermometer, and condenser. The flask is evacuated and flushed with nitrogen three times. The n, 52.06 g of ethylenediamine (EDA) and 125.9 g of hexamethylenediamine (HDA) (as a 60% aqueous solution) are added and the components are heated to 240° C. within 2 hours in a nitrogen atmosphere with stirring. The temperature of 240° C. is maintained for 4 hours. After 2, hours, a vacuum of about 20 mm Hg was applied. The product had an acid value of about 2 and an amine value of about 1.5, and its softening point, as determined by the ring-and-ball method, was 114° C. The Examples listed in Table 1 were carried out in the same manner as Example 1.

TABLE 1

| Example | Dimeric fatty acid (D75) (g) | I | Chain Stopper Acid (g) | II | Acid Equivalence Ratio | EDA (g) | HDA (60%) (g) | Amine Equivalence Ratio | Ring & Ball Softening point (°C.) |
|---|---|---|---|---|---|---|---|---|---|
| 1 | 600 | 44.55 propionic | 30.70 isovaleric | | 0.7:0.2:0.1 | 52.06 | 125.90 | 0.575:0.425 | 114 |
| 2 | 600 | 44.55 propionic | 43.30 ethylhexoic | | 0.7:0.2:0.1 | 45.27 | 148.10 | 0.5:0.5 | 87 |
| 3 | 308 | 17.20 propionic | 33.30 ethylhexoic | | 0.7:0.15:0.15 | 26.72 | 64.62 | 0.575:0.425 | 91 |
| 4 | 300 | 22.28 propionic | 24.26 isononanoic | | 0.7:0.2:0.1 | 22.64 | 74.06 | 0.5:0.5 | 94 |
| 5 | 600 | 53.02 butyric | 26.51 isobutyric | | 0.7:0.2:0.1 | 52.06 | 125.90 | 0.575:0.425 | 113 |
| 6 | 600 | 53.02 butyric | 30.70 isovaleric | | 0.7:0.2:0.1 | 52.06 | 125.90 | 0.575:0.425 | 114 |
| 7 | 825 | 72.90 butyric | 59.55 ethylhexanoic | | 0.7:0.2:0.1 | 74.75 | 117.50 | 0.575:0.425 | 100 |
| 8 | 320 | 28.27 butyric | 27.46 isononanoic | | 0.7:0.2:0.1 | 24.87 | 81.08 | 0.5:0.5 | 96 |
| 9 | 320 | 14.14 butyric | 45.94 ethylhexanoic | | 0.7:0.1:0.2 | 27.36 | 72.98 | 0.55:0.45 | 72 |
| 10 | 320 | 28.27 butyric | 16.62 isovaleric | | 0.7:0.2:0.1 | 19.90 | 97.30 | 0.4:0.6 | 102 |
| 11 | 340 | 35.28 n-valeric | 15.02 isobutyric | | 0.7:0.2:0.1 | 30.39 | 73.22 | 0.575:0.425 | 109 |
| 12 | 300 | 28.55 butyric | 25.16 isovaleric | | 0.65:0.20:0.15 | 28.87 | 69.58 | 0.575:0.425 | 111 |
| 13 | 340 | 26.29 butyric | 28.36 isononanoic | | 0.72:0.18:0.10 | 29.54 | 71.19 | 0.575:0.425 | 98 |
| 14 | 300 | 50.98 caproic | 37.88 ethylhexanoic | | 0.60:0.25:0.15 | 26.41 | 86.11 | 0.5:0.5 | 95 |
| 15 | 360 | 31.80 butyric | (9.21 isovaleric) (13.00 ethylhexanoic) | | 0.70:0.20:0.05:0.05 | 27.70 | 90.77 | 0.5:0.5 | 98 |
| 16 | 360 | 31.80 butyric | 18.42 isovaleric | | 0.70:0.20:0.10 | 27.70 | 72.62 18.5 1,12-di-amino-dodecane | 0.5:0.4:0.1 | 100 |

| Comparative Examples | Dimeric fatty acid (D75) (g) | I | Chain Stopper Acid (g) | II | Equivalence ratio | EDA (g) | Co-Diamine (60%) (g) | Equivalence ratio | Ring & Ball Softening point (°C.) |
|---|---|---|---|---|---|---|---|---|---|
| 1 | 360 | 26.70 propionic | — | | 0.778:0.222 | 28.10 | 67.33 HDA | 0.575:0.425 | 117 |
| 2 | 360 | 32.51 acetic | — | | 0.7:0.3 | 40.74 | 38.09 IPD | 0.75:0.25 | 119 |
| 3 | 360 | 21.67 acetic | 25.98 ethylhexoic | | 0.7:0.2:0.1 | 43.46 | 13.38 PrDA$_{1,3}$ | 0.8:0.2 | 88 |

TABLE 1-continued

| 4* | — | — | — | — | — | — | — | 97 |

HDA = Hexamethylenediamine (1,6-diaminohexane)
PrDA$_{1,3}$ = Propylenediamine (1,3-diaminopropane)
EDA = Ethylenediamine (1,2-diaminoethane)
IPD = 1-Amino-3-aminomethyl-3,5,5-trimethylcyclohexane
* = Commercial product based on dimeric fatty acid, amines, and chain stopper; exact composition unknown

TABLE 2

| Example from Table 1 | Ethanol dilutability (% resin) |
| --- | --- |
| 1 | less than 1.0 |
| 2 | less than 1.0 |
| 3 | less than 1.0 |
| 4 | less than 1.0 |
| 5 | less than 1.0 |
| 6 | less than 1.0 |
| 7 | less than 2.0 |
| 8 | less than 1.0 |
| 9 | less than 1.0 |
| 10 | less than 1.0 |
| 11 | less than 1.0 |
| 12 | less than 1.0 |
| 13 | less than 1.0 |
| 14 | less than 1.0 |
| 15 | less than 1.4 |
| 16 | less than 1.4 |
| Comparative examples from Table 1 | |
| 1 | 8.9 |
| 2 | less than 1.0 |
| 3 | 5.6 |
| 4 | less than 1.5 |

All of the inventive polyamide resins listed in Table 1 were then treated and tested as described below.

Test for ethanol dilutability 3 g of polyamide resin are introduced into a 500 ml Erlenmeyer flask and dissolved in 7 g ethanol with stirring. Pure ethyl alcohol is then added from a burette until the initially clear solution starts to cloud.

Dilutability with ethanol is expressed as the percent of polyamide resin then contained in the diluted, still barely clear solution. (See Table 2.)

Preparation of printing inks and ink films

The polyamide resins are dissolved in the solvents or solvent mixtures indicated in Table 3 below, in the presence of an extender where indicated. The solution is then placed in the milling cup of a ball mill and combined with the pigment indicated in the Table. After dispersing for 20 minutes, the ink is removed. (If soluble dyes are used, this grinding process is omitted.) The corresponding additives are then added. The ink stocks obtained in this way (cf. Table 3) are diluted with ethanol to a runout time of 20–22 seconds (DIN 4 mm cup) before printing.

The finished printing inks so obtained are then used to print with a commercial laboratory printing press from cylinder to cylinder both onto polyethylene foil and onto uncoated cellophane foil. After a 2-day storage time at room temperature, the printed films are subjected to the tests described below.

Tests on printing-ink films (a) "Crinkle test"

In this test, the stored printing ink films obtained on polyethylene are immersed in water at 20° to 23° C. for 24 hours and immediately after their removal from the bath the printing films are rubbed against each other with the balls of the thumbs, under pressure, and crinkled.

Ratings:
1. Printing ink film remained completely intact.
2. Printing ink film had cracks.
3. Printing ink film had flaked off in places.
4. Printing ink film was practically destroyed.
5. Printing ink film had flaked off in places even *without* having been abraded.
(See Table 2.).

(b) Blocking point

Portions of the stored printing films on uncoated cellophane are folded in contact with each other and placed between plane ground glass plates. The latter are then stored in a drying cabinet under a load of 60 g/cm$^2$ at temperature which is increased daily by 10° C.

The criterion for evaluation is the temperature at which the printing ink films show initial very slight damage after being unfolded. (See Table 2.).

TABLE 3

| Ink of Example | Pbw | Extender | Pbw | Solvent | Pbw | Pigment or Dye | Pbw | Additive | Pbw | Crinkle Test | Blocking Point (°C.) |
| --- | --- | --- | --- | --- | --- | --- | --- | --- | --- | --- | --- |
| 1 | 30 | — | — | Ethanol | 70 | (1) | 10 | — | — | 1–2 | 65 |
| 2 | 30 | — | — | Ethanol | 70 | (1) | 10 | — | — | 1 | 60 |
| 3 | 30 | — | — | Ethanol | 70 | (1) | 10 | — | — | 2 | 50 |
| 4 | 30 | — | — | Ethanol | 70 | (1) | 10 | — | — | 2 | 50 |
| 5 | 30 | — | — | Ethanol | 70 | (1) | 10 | — | — | 2 | 65 |
| 6 | 30 | — | — | Ethanol | 70 | (1) | 10 | — | — | 1–2 | 75 |
| 7 | 30 | — | — | Ethanol | 70 | (1) | 10 | — | — | 2 | 55 |
| 8 | 30 | — | — | Ethanol | 70 | (1) | 10 | — | — | 1–2 | 55 |
| 9 | 30 | — | — | Ethanol | 70 | (1) | 10 | — | — | 1–2 | 50 |
| 10 | 30 | — | — | Ethanol | 70 | (1) | 10 | — | — | 1–2 | 60 |
| 11 | 30 | — | — | Ethanol | 70 | (1) | 10 | — | — | 1–2 | 55 |
| 12 | 30 | — | — | Ethanol | 70 | (1) | 10 | — | — | 2 | 60 |
| 13 | 30 | — | — | Ethanol | 70 | (1) | 10 | — | — | 1–2 | 55 |
| 14 | 30 | — | — | Ethanol | 70 | (1) | 10 | — | — | 2 | 55 |
| 15 | 30 | — | — | Ethanol | 70 | (1) | 10 | — | — | 1–2 | 60 |
| 16 | 30 | — | — | Ethanol | 70 | (1) | 10 | — | — | 2 | 60 |
| 1 | 20 | — | — | Ethanol/ n-Propanol = 4:1 | 80 | (3) | 30 | — | — | 1–2 | 65 |

TABLE 3-continued

| Ink of Example | Pbw | Extender | Pbw | Solvent | Pbw | Pigment or Dye | Pbw | Additive | Pbw | Crinkle Test | Blocking Point (°C.) |
|---|---|---|---|---|---|---|---|---|---|---|---|
| 1 | 20 | (5A) | 10 | Ethanol/Ethylacetate/n-Propanol=2:2:1 | 70 | (2) | 10 | (7) | 1.5 | 1-2 | 90 |
| 11 | 20 | (5A) | 10 | Ethanol/Ethylacetate/n-Propanol=2:2:1 | 70 | (4) | 8 | — | — | 2 | 85 |
| 3 | 20 | (5A) | 10 | Ethanol/Ethylacetate/Ethyleneglycol=10:9:1 | 70 | (1) | 10 | (8) | 2.0 | 1-2 | 80 |
| 6 | 20 | (5A) | 10 | Isopropanol/Ethyleneglycol=10:9:1 | 70 | (1) | 10 | (8) | 2.0 | 1-2 | 85 |
| 15 | 20 | (5A):(6)=2:1 | 10 | Ethanol/Isopropyl acetate/n-Propanol=2:2:1 | 70 | (1) | 10 | (8):(7)= | 2.0 | 1-2 | 70 |
| 3 | 20 | (5B) | 10 | n-Butanol/Ethyl acetate/Acetone=3:6:1 | 70 | (1) | 10 | (8) | 1.5 | 2 | 80 |
| 6 | 20 | (5B) | 10 | Ethanol/Isopropyl acetate/Ethylene glycol=10:9:1 | 70 | (1) | 10 | (9) | 0.5 | 1-2 | 80 |
| 11 | 20 | (5B) | 10 | Isopropanol/n-Propyl acetate/Ethylene glycol=10:9:1 | 70 | (3) | 45 | (8) | 2.0 | 1-2 | 95 |
| 1 | 30 | — | — | Ethanol | 70 | (1) | 10 | — | — | 2-3 | 70 |
| 2 | 30 | — | — | Ethanol | 70 | (1) | 10 | — | — | 4-5 | 65 |
| 3 | 30 | — | — | Ethanol | 70 | (1) | 10 | — | — | 4-5 | 60 |
| 4 | 30 | — | — | Ethanol | 70 | (1) | 10 | — | — | 3 | 50 |

(1) = red organic pigment ("Litholscharlack 3700")
(2) = blue organic pigment ("Heliogen blau")
(3) = TiO$_2$ white pigment ("RN 63")
(4) = soluble orange dye ("Orasol orange GRW")
(5A) = alcohol soluble nitrocellulose ("A 400")
(5B) = ester soluble nitrocellulose ("E 600")
(6) = ketone resin ("SK")
(7) = wax dispersion ("Luboprint")
(8) = lubricant ("Kemamide E")
(9) = stabilizer ("Jonol")

What is claimed is:

1. A polyamide, alcohol soluble at room temperature, prepared by the condensation of an acid component comprising
   (A) dimerized fatty acids having from 16 to 44 carbon atoms with
   (B1) at least one aliphatic linear monocarboxylic acid having 3 to 6 carbon atoms, and
   (B2) at least one aliphatic branched monocarboxylic acid having 4 to 9 carbon atoms, the equivalence ratio between components (A) and (B) ranging from 0.73:0.27 to 0.6:0.4, and each of the components (B1) and (B2) being present in an amount of at least 0.1 equivalent, based on unit total acid equivalent, and an amine component comprising
   (C) ethylenediamine and
   (D) hexamethylenediamine, the equivalence ratio between component (C) and (D) ranging from 0.7:0.3 to 0.4:0.6.

2. A polyamide as in claim 1 comprising a single aliphatic linear monocarboxylic acid as component (B1) and a single aliphatic branched monocarboxylic acid as component (B2).

3. A polyamide as in claim 1 wherein the equivalence ratio between components (A) and (B) is 0.7:0.3.

4. A polyamide as in claim 1 wherein said monocarboxylic acid (B1) is at least one member selected from the group consisting of propionic acid, n-valeric acid, and n-caproic acid.

5. A polyamide as in claim 1 wherein said monocarboxylic acid (B1) is butyric acid.

6. A polyamide as in claim 1 wherein said monocarboxylic acid (B2) is at least one member selected from the group consisting of 3-methylbutyric acid and 2-ethylhexanoic acid.

7. A polyamide as in claim 1 wherein each of said components (B1) and (B2) is present in an amount of at least 0.1 equivalent, based on unit total acid equivalent.

8. A printing ink comprising an alcohol solvent, a polyamide as in claim 1 as the binder, and a pigment or soluble dye.

9. A printing ink as in claim 8, adaptable to gravure or flexographic printing, wherein said solvent is an aliphatic alcohol having from 2 to 4 carbon atoms and said printing ink has a solids content of about 20 to 50 percent, corresponding to a runout time of 15 to 30 seconds (DIN 4 mm cup).

10. A printing ink as in claim 9 wherein said solvent is ethanol and the solids content of said printing ink is from 25 to 35 percent, corresponding to a runout time of 18 to 25 seconds.

* * * * *